United States Patent Office 3,132,119
Patented May 5, 1964

3,132,119
MODIFIED UREA-FORMALDEHYDE RESIN COMPOSITION AND COATED PRODUCTS MADE THEREWITH
Roger L. Abler, White Bear Lake, Minn., assignor to Minnesota Mining and Manufacturing Company, St. Paul, Minn., a corporation of Delaware
No Drawing. Filed May 27, 1959, Ser. No. 816,074
2 Claims. (Cl. 260—70)

The present invention relates generally to coated abrasive structures and to compositions of a type suited for use as an abrasive binder in such structures. More particularly it concerns coated abrasive sheet structures employing novel modified urea-aldehyde resin abrasive binders, novel stable curable modified urea-aldehyde resin compositions, and to methods involved in manufacturing such resin compositions.

Condensation resin compositions obtained by reacting urea and formaldehyde have long been known. Ordinarily, these are produced by heating urea and formaldehyde in aqueous medium first under mildly basic conditions. Various polymerizable methylol derivatives of urea are believed to be thereby formed. The reaction is then continued by heating the reaction mixture under acidic conditions at which time condensation polymerization takes place. The condensation reaction can be stopped by reconversion of the system to basic conditions when the desired degree of polymerization is reached, as indicated for example by the viscosity of the resin composition obtained. At this point the resin can be stored at least for some length of time. When it is to be used, an acid or acid-engendering material is added to the resin composition, rendering it acidic, and the composition is then applied as desired. Under slightly elevated temperatures (and more slowly at room temperatures) the composition condenses further to an infusible state.

Urea-aldehyde resin compositions have various characteristics which render them attractive for use as heat-setting or heat-advancing resin compositions in flexible coated abrasive sheet products. For example, they are formed from relatively low cost starting materials. They are rather rapid curing. Curing conditions are relatively mild. However, unmodified resins have various disadvantages, which, for the most part, have prevented them from achieving very wide usage. The cured resins are brittle and tend to craze rather badly upon aging, and thus become brittle and lose their holding power for abrasive grains. Impact resistance is poor. Moreover, curable urea-aldehyde resins characteristically have rather poor shelf life.

In accordance with the present invention, I have provided novel modified urea-formaldehyde resin compositions, wherein basic advantageous characteristics exhibited by urea-aldehydes are retained, and yet wherein the above-noted and other inherent disadvantages of unmodified urea-aldehyde resins are obviated. I provide, for example, heat-advancing modified urea-formaldehyde resins which have a shelf life of at least several weeks, and which, under refrigerated conditions, can be stored for several months, and then used. Once accelerated or catalyzed they rapidly cure under slightly elevated temperatures. Upon curing, a hard tough infusible essentially non-crazing composition results. Although having a wide range of utility for such uses as potting compounds, molding resins, etc., the resin compositions hereof are especially suitable as abrasive binders. By unique manufacturing procedures, the useful pot life of the compositions hereof (once the acid or acid engendering accelerator has been added) can be extended. Thus the pot life of my preferred compositions is sufficiently long to enable them to be readily used in bulk in large scale commercial operations.

The resin compositions can be employed both as the first or so-called "making" coat of the abrasive sheet materials, in which case the resin is coated on the sheet backing with the abrasive grains added thereto, and as the "size" coating which is applied over the abrasive grains. Or some other suitable adhesive binder such as hide glue or heat-advancing phenolic resin or the like can be utilized as the "making" coat while my composition is utilized as the "size" coat, or vice versa. When used as a binder composition my novel resins can be filled or unfilled, altehough I prefer to employ some amount of inert filler, such as pyrophyllite or barytes therein.

In the preferred resin compositions hereof, urea and formaldehyde are co-reacted with and their reaction product modified by a di-amino compound exemplified by hydrazine and a dihydric compound such as propylene glycol, to form a stable curable composition. It can be employed in solution as a coating composition, or as a potting compound or it can be dehydrated and granulated and used as a molding resin. Once dehydrated, the resin can be redissolved and used again in solution form.

My novel compositions can be prepared generally in the same fashion in which unmodified urea-aldehyde resins are prepared. The co-reactants in aqueous solution first are heated together while the solution is maintained mildly basic, e.g. at a pH of about 7.8–9.0. Various modified methylol urea derivatives are thereby formed. The solution is then rendered acidic, for example to a pH of about 4.9–5.3, and heating is continued, while condensation polymerization occurs. Reaction is continued until polymerization has proceeded to the desired state when it is stopped by raising the pH of the still liquid solution or dispersion to the basic range.

When so prepared, the pot life of the resulting resin is sufficiently great for many uses; often it is too short to permit use of the resin in large bulk quantities. By novel modified procedures, however, the useful pot life can be extended and adjusted. This I accomplish by retaining some small amount, for example about ⅕ or up to about ¼ of the total amount of urea until after the condensation reaction under acid conditions has been completed and the pH of the reaction mixture has been re-adjusted from acid to basic conditions. The remainder of the urea is then blended in and the mixture is then heated for a period thereafter, for example for one hour at a temperature of from say 80–90° C. to cause the newly added urea to react. The pot life, after the ammonium chloride or equivalent accelerator has been added, thereby is increased from only about two hours to as much as 8 hours at room temperature.

Many dihydric compounds can be utilized in preparing the structures hereof. For example, ethylene glycol, propylene glycol, polyethylene glycols, polypropylene glycols and other higher glycols, such as 2-methyl-2, 4-pentanediol, can be used. Cyclic diols, such as cyclohexanediol, are useful. The sulfur analogues of the diols can also be employed, ethylene mercaptan being exemplary. Or, one of the hydroxyls on the diol can be substituted by a mercapto group such as is the case in β-mercaptoethanol.

Although the mercaptans are disadvantageous in some respects because of the characteristic odor thereof, I have found that once reacted into the modified urea-aldehyde compositions hereof, the odor disappears.

Various di-amino compounds can be utilized in place of hydrazine with roughly equivalent results. Water-soluble aromatic diamines, such as metaphenylenediamine, can be used although they tend to retard the cure time of the resin composition somewhat. Monoaromatic substituted hydrazines, typified by phenylhydrazine, can also be employed, although their slight solubility in water renders them somewhat slowly reacting. Cyclically bound diamines such as piperazine can also be used. On the other hand, the aliphatic and cycloaliphatic diamines tend to be excessively basic and inhibit cure of the resin.

Having now described my invention in a general way, the same will now be more specifically described with the aid of the following examples. In the examples, all parts and percentages shown are by weight unless otherwise noted.

EXAMPLE I

A 700-gallon stainless steel kettle was charged with 2432 lbs. of 37% formaldehyde, 7.4 lbs. of 5% NaOH, 960 lbs. of urea, 200 lbs. of 1,2-propanediol, and 58 lbs. of aqueous 54.4% hydrazine solution. The temperature was raised to 122° F. over a 30 minute period. The pH was found to be 7.8. The reaction mixture was then adjusted to a pH of 5.2 by the addition of 3.6 lbs. of 5% HCl, followed by heating at 176° F. for 40 minutes, the resultant pH being 4.6. The pH was raised to 8.6 by adding 8.7 lbs. of 5% NaOH solution, and 240 additional pounds of urea was added. This mixture was then further reacted for 60 minutes at 178° F. The resultant pH of 6.9 was raised to 8.5 by adding 2.5 lbs. of 5% NaOH. The resin solution was then concentrated by heating at 99° F. and 24 mm. pressure for 110 minutes. The viscosity of the resultant resin was reduced to 2050 cps. at 25° C. by adding 70 lbs. of water. The final resin solution contained 77% nonvolatile material.

The resin of this example was used as a sandsize adhesive for close coat grade 60 drills cloth-backed garnet coated abrasives. A make adhesive of conventional hide glue and a standard amount of garnet mineral was applied to a drills cloth-backing. The resin of this example was then diluted with water to a non-volatile percentage of 65% and catalyzed with a 25% aqueous solution of $NH_4Cl$, 0.5 pound of solid $NH_4Cl$ being added for every 100 pounds of non-volatile resin solids. A sandsize consisting of 12 lbs. of catalyzed resin solution was applied per sandpapermaker's ream and the material then cured in festoons for 25 minutes at 150° F.

A portion of the resulting sheet was flexed and a 4″ x 147″ endless belt formed therefrom. When driven at 3690 s.f.p.m. and used to sand the side grain on a 6″ x 2″ hickory block face, this belt cut 2,897 gms. in 32 minutes, and thus was fully satisfactory as an abrasive sheet.

To another 30 gram portion of the curable resin composition of the present example was added 0.15 gram of ammonium chloride. A patty was then formed of the composition and cured for one hour at 100° C. The resulting solid was pale yellow in color and exhibited a Knoop hardness of 29 under a 300-gram load.

The following example illustrates a sandpaper prepared utilizing the modified urea-aldehyde compositions hereof as the entire abrasive binder, i.e., as both the making coat and sandsize.

EXAMPLE II

The liquid curable hydrazine propanediol modified urea-formaldehyde resin of Example I is diluted with water to a 75% solution. Following this ammonium chloride accelerator is added thereto in the amount specified in Example I. The resin solution is then coated on cylinder paper (weight 130 pounds per papermaker's ream), wet coating weight being 1.56 pounds per sandpaper maker's ream. Grit 150 aluminum oxide mineral is then electrostatically applied to the adhesive coated surface at a coating weight of 11.7 pounds per sandpaper maker's ream. The thus coated sheet is then cured on festoons for 15 minutes at 165° F., following which a sandsize of the same resin composition as employed in the making coat is applied at a wet coating weight of 7 pounds per sandpaper maker's ream. The sheet is again festooned and finally cured for 20 minutes at 165° F. A highly suitable abrasive sheet product results, which can be stored for months without degradation or crazing of the binder.

EXAMPLE III

To an one-liter 3-necked reaction flask fitted with condenser, thermometer and stirrer, was charged 240.2 grams (4 moles) of urea, 648 grams (8 moles) of a 37% aqueous solution of formaldehyde (the pH of which previously had been adjusted to 8.8 by the addition of dilute sodium hydroxide), 47 grams of ethylene mercaptan and 12.5 grams (0.25 mole) of 64% hydrazine solution. The reaction flask was heated to raise the temperature of the reaction mixture from room to about 55° C. over the course of 50 minutes. The pH of the reaction mixture was then lowered to 5.8 through the addition of dilute hydrochloric acid solution. The mixture was then heated to 70° C. for one hour, following which the pH of the reaction mixture was increased from 4.7 (to which it had dropped during heating) to 8.9 through the addition of dilute sodium hydroxide solution. An additional 60.1 grams (1 mole) of urea was then added to the reaction vessel and the reaction mixture was cooked for an additional hour at 70–75° C., the pH dropping to about 7.3 during this period. The pH was then adjusted to 8.0 by the addition of dilute sodium hydroxide solution, and the resin product was concentrated to a viscosity of about 2500 cps. at 26° C. by distillation at reduced pressure.

Stirred into the resulting resin was 0.02 gram of 25 percent aqueous ammonium chloride per gram of resin. A patty was formed from the viscous mass which was cured for 20 minutes at 75° C. A strong tough straw-colored solid resin resulted which exhibited a Knoop hardness of 34.5 under a 300 gram load. After being stored for several weeks, the resin patty showed no tendency toward crazing. Such a resin composition is highly satisfactory as an abrasive binder.

Although the reaction mixture exhibited the characteristic odor of the mercaptan, the final cured product was substantially odorless. Such is also the case with the various other dimercapto and mercapto alkanol compounds which can be employed as modifiers in the resin compositions hereof.

The following example illustrates the use of an aromatic-substituted diamine instead of hydrazine in my novel resinous compositions.

EXAMPLE IV

To a three-necked reaction flask equipped as previously described was added 240.2 grams (4 moles) of urea, 648 grams of 37% aqueous formaldehyde solution (8 moles) the pH of which was previously adjusted to 8.7, 26 grams (.25 mole) of m-phenylene diamine and 50 grams of propylene glycol. Over a period of one hour the reaction temperature was raised from room temperature to 73° C. Dilute hydrochloric acid was added to lower the pH to 6.1. The reaction mixture was then cooked at a temperature of 73–87° C. for about one hour, after which the pH was raised to 7.2 by the addition of dilute sodium hydroxide. An additional 60.1 grams of urea were then added. The reaction mixture was allowed to stand overnight following which it was heated to 80° C. for about 90 minutes. The pH was adjusted from 6.6 to 7.4 and the resin product was concentrated to a viscosity of about 2500 cps. at 25° C. by vacuum distillation procedures.

A viscous resin resulted which was usable even after storage under slightly refrigerated conditions for several months.

Stirred into the resulting viscous resin were 0.02 gram of 25% aqueous ammonium chloride per gram of resin. The accelerated composition was then formed into a patty and cured for 20 minutes at 75° C. A somewhat flexible orange-red colored product resulted which, upon further cure overnight at room temperature, became tough and hard. Knoop hardness of the cured resin was 29.4 under a 300 gram load. Upon being stored for several weeks the cured resin showed no tendency to craze.

Very satisfactory abrasive sheet structures can be formed utilizing the resin of the present example as an abrasive binder.

EXAMPLE V

A stable resin composition was prepared as in the preceding example employing 240.2 grams (4 moles) of urea, 648 grams (8 moles) of 37% basic formaldehyde solution, 50 grams of polyethylene glycol "200" and 27 grams (0.25 mole) of phenylhydrazine. Over a 40- minute period the temperature was raised to 67° C., at which time the pH was adjusted to 5.1 through the addition of dilute hydrochloric acid. The reaction mixture was then heated to 75° C. for 50 minutes. After adjusting the pH of the resulting material to 8.5 by the addition of dilute sodium hydroxide, an additional 60.1 grams (1 mole) were added. Cooking was continued for 80 minutes at 75° C. The pH was then adjusted to 8.0 and the product concentrated by vacuum distillation to a viscosity of about 2000 cps. at 25° C.

After the addition of ammonium chloride as in the preceding example the resin was formed into a patty and cured for 15 minutes at 75° C. An orange-red colored product resulted highly suitable as a binder in coated abrasive sheets. Knoop hardness of the cured product was 37.4 under a 300 gram load. Although as the present example demonstrates, phenylhydrazine is a suitable substitute for the hydrazine in the compositions hereof, phenylhydrazine appears to be only very slowly reactive during the first stage of the reaction carried out under basic conditions. This presumably is because of its only slight solubility in the aqueous reaction medium. However, it is very soluble as the hydrochloride acid salt (see Lange, Handbook of Chemistry, Sixth Edition), and thus becomes soluble and apparently reactive during the second stage of the reaction when the pH has been lowered with HCl. Preferably the diamino compound is readily soluble in the aqueous reaction medium during both stages of the reaction and must have at least significant solubility during the second (acid) stage. In either event for my purposes they are "soluble."

Various soluble diamino compounds, in addition to the aromatic diamines illustrated in Example IV and the monoaromatic substituted hydrazines illustrated in the present example, can also be utilized in the procedures hereof in place of hydrazine. Compounds having cyclically bound amino groups such as piperazine serve excellently. Significantly, where piperazine is employed a suitable resin results even if the dihydric alcohol or equivalent component is omitted. However the use of some dihydric alcohol is preferred, as the impact resistance of the product is thereby improved.

EXAMPLE VI

Various resin compositions employing similar starting materials in varying proportions were prepared employing similar procedures. To reaction vessels were charged an identical 240.2 grams (4 moles) of urea. Varying amounts of (a) 37 percent aqueous formaldehyde solution previously treated with dilute sodium hydroxide solution to raise the pH to about 8.1 (b) polyethylene glycol and (c) 64 percent aqueous hydrazine solution were also charged to the vessels. Each reaction mixture was heated for approximately 45 minutes to raise the temperature to about 50–65° C., at which time the pH was lowered to about 5.0–5.3 with dilute HCl. The reaction mixture was cooked for approximately 45 minutes at a temperature of 65–70° C. at which time dilute NaOH was added to raise the pH to about 8.1–8.8. An additional 60.1 grams (1 mole) of urea was then added. Reaction was continued at a temperature of about 70–80° C. for about 90 minutes after which the pH again was adjusted to about 8.1–8.4 with dilute sodium hydroxide. The resulting resinous materials were then concentrated by vacuum distillation to a viscosity of about 2000 cps. at 25° C.

To each of the resins was then added 0.02 gram of 25% aqueous ammonium chloride per gram of resin, after which the resin compositions were formed into patties and cured for one hour at 70° C. The Knoop hardness of the resulting cured patties, under a 300 gram load, was then determined. The ratios of the reactant materials employed and brief descriptions of the physical characteristics of the resulting resin compositions are shown in the following table:

Table

| | | | | | | |
|---|---|---|---|---|---|---|
| Mols urea | 1 | 1 | 1 | 1 | 1 | 1. |
| Mols HCHO | 1.200 | 2.100 | 2.664 | 1.500 | 1.600 | 1.600. |
| Mols hydrazine | .050 | .050 | .534 | .010 | .050 | .050. |
| Avg. mol wt. of polyethylene glycol used | .400 | .400 | .200 | .200 | .200 | .200. |
| Gms. Polyethylene glycol/gm. urea | .333 | .333 | .358 | .333 | 1.000 | .083. |
| Knoop hardness | 24 | 26 | 24 | 37 | 8.5 | 40. |
| Color of Cured Film | Pale Yellow | Pale Yellow | Bright Red [1] | Pale Yellow | Pale Yellow | Pale Yellow. |
| Effect of aging 2 weeks at room temperature | Very Slight Crazing | None | None | Slight Cracking | None | None. |

[1] Slow curing.

Each of the resin compositions prior to the addition thereto of the acid accelerator was rather stable, and could be stored for long periods, e.g., many months or more, under somewhat refrigerated conditions, such as 40° F. Under such conditions little or no autogenous cure takes place. Although the shelf life is somewhat diminished under storage at room temperatures, storage life nevertheless, is substantial, and extends at least for several weeks.

Except for the dihydric alcohol component the respective amounts of the reactants are shown in the table on a molar basis. Generally this has been found to be the basis upon which their influence, or the influence of their respective equivalents, bears upon the resulting composition.

Formaldehyde should be present in a slight stoichiometric excess with respect to the urea and hydrazine. I prefer that from about 1.1 to about 1.9 moles of formaldehyde be present for each mole of total urea added, and an additional 2 moles for each mole of hydrazine or equivalent. Preferably the hydrazine should be present in amounts greater than about 0.01 mole per mole of urea. At this low amount the effect of the hydrazine is diminished as evidenced by some slight crazing in the sample upon aging. At amounts of hydrazine over about one-half mole per mole of urea some softening in the cured resin occurs, and rate of cure of the resin may decrease.

The dihydric alcohol component appears to exert its influence on the basis of the weight thereof present, largely irrespective of the molecular weight thereof (and thus largely irrespective of the total number of its reactive groups present). Equal weights of glycols, such as propylene glycol and ethylene glycol, or polymeric glycols, exemplified by polypropylene and polyethylene glycols, impart similar results where they are substantially water soluble. Although the glycol or equivalent mercapto-component undoubtedly contributes a physical (perhaps plasticizing) action, it chemically interacts as well. This is evidenced, for example, by the reduction in odor where a resin employing a dimercapto compound is prepared. The glycol thus should be soluble or in other reactive form. For example, where polyethylene glycol "1500" is used, which contains a substantial amount of rather insoluble (and apparently unreactive) material, much softer and inferior cured resins result than where an equal amount of substantially soluble glycol is used.

As will be observed from the table, high amounts of the glycol component cause a substantial softening in the resin, while very low amounts thereof ordinarily cause brittleness. Although resins with high amounts of glycol undoubtedly are useful for many purposes, where my resins are utilized as abrasive binders I prefer those wherein the Knoop hardness is at least about 15 and in which no more than about 0.7 part glycol per part of urea is used.

EXAMPLE VII

A resin is prepared having the same total formulation as that described in Example I. The procedures of preparation are the same, except in the present example all of the urea is added initially and hence no further reaction under basic conditions is carried out after the acid reaction stage. A suitable resin composition results, but upon addition of the ammonium chloride thereto, the useful pot life is found to be only about one-half that of the composition of Example I.

Upon addition of some of the urea under basic conditions after the acid reaction stage, the useful pot life of the resin is lengthened. The amount of extension depends upon the amount of urea held out and added later. However, in the interest of completeness of reaction, I prefer to hold out no more than about one-fourth of the total urea (that is where one-third of that initially charged is added later) so that sufficient of the reactant will be present during the united polymerization reaction.

Having now described my invention with the aid of various specific examples it is noted that such has been done for purposes of illustration not limitation. Various modifications and substitutions will be apparent from the foregoing which fall within the spirit of my invention. These are comprehended, as are all other embodiments which fall within the purview of my description taken as a whole including the appended claims.

What is claimed is as follows:

1. A curable modified urea-formaldehyde resin composition, capable of being stored for at least several months and then cured, by the addition thereto of an acid-engendering material, to a tough firm non-crazing infusible product, said composition consisting essentially of the ungelled partial polymerization product formed by first reacting the following ingredients:
(a) urea,
(b) from .01 mole to 0.5 mole per mole of urea of a soluble diamino compound selected from the group consisting of hydrazine, phenylhydrazine, diamino benzene, and piperazine,
(c) formaldehyde in a total amount at least equal to 1.1 moles per mole of urea and 2 moles per mole of said diamino compound, and
(d) from 0.08 to 1.00 part per part by weight of urea of a water-soluble compound selected from the group consisting of hydrocarbon diols, polyether diols, and sulfur analogues of said diols wherein at least one OH group has been replaced by an SH group under mildly basic conditions to form modified methylol urea derivatives, then reacting said modified methylol urea derivatives under mildly acidic conditions at a pH not lower than about 4.6 until condensation polymerization occurs, and then further reacting said ingredients under mildly basic conditions.

2. A method of making a usefully stable curable modified urea-formaldehyde condensation resin reaction product of
(a) urea,
(b) from .01 mole to 0.5 mole per mole of urea of a soluble diamino compound selected from the group consisting of hydrazine, phenylhydrazine, diamino benzene, and piperazine,
(c) formaldehyde in an amount at least equal to 1.1 moles per mole of urea and 2 moles per mole of said diamino compound and
(d) from 0.8 to 1.00 part by weight per part of urea of a water-soluble compound selected from the group consisting of hydrocarbon diols, polyether diols, and sulfur analogues of said diols wherein at least one OH group has been replaced by an SH group, said reaction product having extended pot life upon acidification with an acid-engendering accelerator, said method comprising:
(1) reacting the said diamino compound, the said formaldehyde, the said water-soluble compond, and from three-fourths to four-fifths of said urea in a mildly basic aqueous medium at a temperature and for a time sufficient to yield modified methylol derivatives,
(2) converting the reaction mixture to acid conditions, at a pH not less than about 4.6, and heating said mixture at a temperature and for a time sufficient to effect condensation polymerization,
(3) re-converting the reaction mixture to mildly basic conditions,
(4) adding the remaining urea, and
(5) cooking the reaction mixture while maintaining the said mildly basic conditions until substantially all of said newly added urea has been reacted.

References Cited in the file of this patent

UNITED STATES PATENTS

| | | |
|---|---|---|
| 2,302,711 | Oglesby et al. | Nov. 24, 1942 |
| 2,334,545 | D'Alelio | Nov. 16, 1943 |
| 2,347,662 | Carlton et al. | May 2, 1944 |
| 2,554,424 | Suen | May 22, 1951 |
| 2,669,551 | Vaughan | Feb. 16, 1954 |
| 2,699,435 | Auten et al. | Jan. 11, 1955 |
| 2,723,253 | Wandell | Nov. 8, 1955 |

FOREIGN PATENTS

| | | |
|---|---|---|
| 532,326 | Canada | Oct. 30, 1956 |